Sept. 17, 1935.  E. E. HEWITT  2,014,895
AIR STRAINER
Filed Jan. 27, 1932
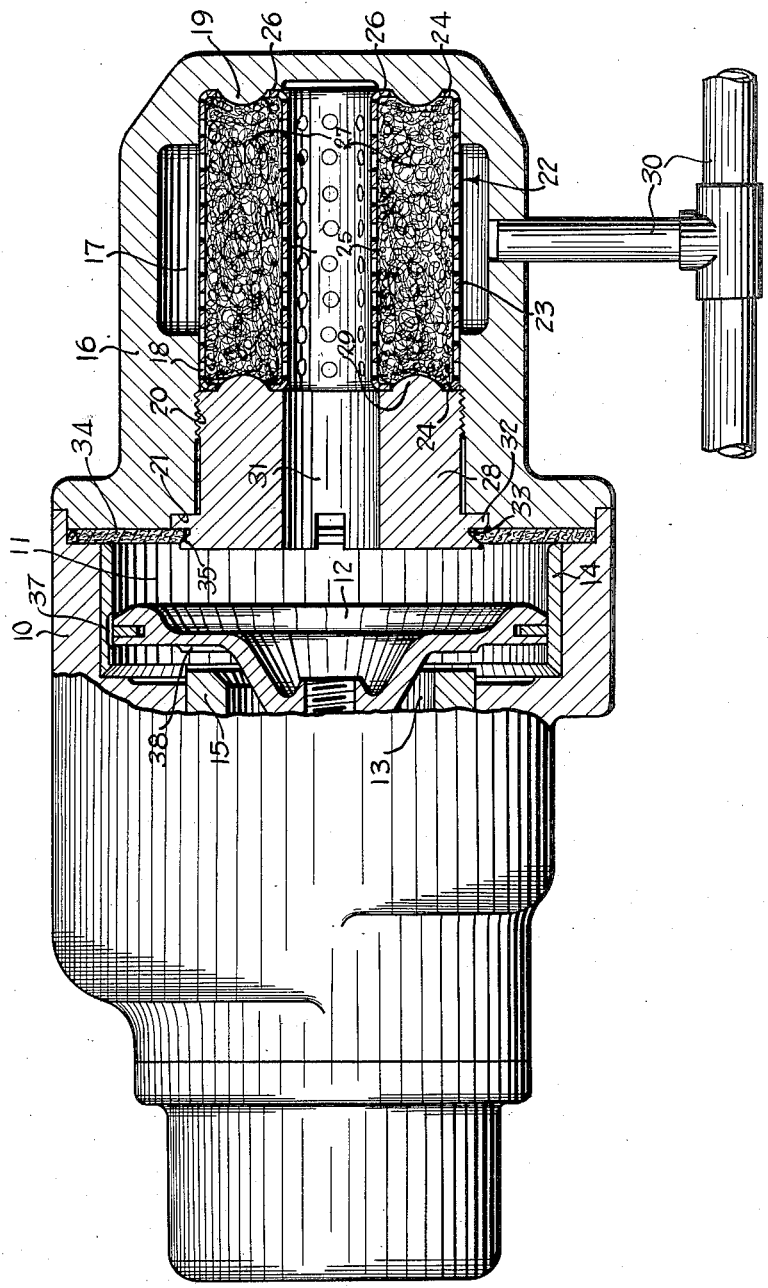
INVENTOR.
ELLIS E. HEWITT.
By *Wm. M. Cady*
ATTORNEY.

Patented Sept. 17, 1935

2,014,895

UNITED STATES PATENT OFFICE 2,014,895

AIR STRAINER

Ellis E. Hewitt, Edgewood, Pa., assignor to The Westinghouse Air Brake Company, Wilmerding, Pa., a corporation of Pennsylvania Application January 27, 1932, Serial No. 589,113

3 Claims. (Cl. 183—47)

This invention relates to fluid pressure operated devices, and more particularly valve devices such as are utilized in fluid pressure brake systems.

The fluid pressure operated valve devices employed in these systems are subject to brake pipe pressure and are operable by variations in brake pipe pressure to control the application and release of the brakes.

In a large measure, the successful operation of the brakes is dependent upon the prompt and effective operation of the valve devices. If fluid supplied to the several valve devices should contain foreign matter, such foreign matter will be deposited in the devices and upon accumulation in any appreciable amounts, it will tend to impair the proper operation of the device and in some instances result in the complete failure of the device.

One object of the present invention is the provision in a fluid pressure operated valve device of improved means for freeing the operating fluid of foreign matter prior to its admission to the operating parts of the valve device.

Another object resides in the provision of improved means for anchoring and retaining a cylinder cover gasket in a fluid pressure valve device.

A further object lies in the provision of improved means for releasably retaining a fluid strainer in the cylinder cover of a fluid pressure valve device.

Another object is found in the provision of an improved means in the form of a single element adapted to releasably retain both the fluid strainer and the sealing gasket in the fluid pressure valve device.

A more specific object resides in the improved construction and arrangement of parts which provide a simple and effective means for insuring against faulty operation of the valve device due to the admission of foreign matter thereto and also provides an improved means for anchoring the cylinder cover gasket to further insure proper operation of the device by providing an improved piston seal.

Other objects and advantages will appear from the following description of an illustrative embodiment of the present invention.

In the accompanying drawing, the single figure is a view, partially in section, of a fluid pressure operated valve device showing a fluid strainer and cylinder cover gasket together with means for releasably retaining them in position in the valve device in accordance with my invention.

The valve device shown in the accompanying drawing is of the type employed in fluid pressure brake equipment and comprises a casing 10 having a piston chamber 11, containing a piston 12 and a valve chamber 13 containing the usual slide valve device (not shown) adapted to be operated by movement of the piston 12. The chambers 11 and 13 are respectively provided with rust-proof bushings 14 and 15. The open end of the piston chamber 11 is adapted to be closed by the application of a cylinder cover 16 containing a chamber 17, which is open to piston chamber 11 through a bore 18. The bore 18 is provided, at its base, with an annular rib or bead 19 and screw threading 20 is formed in the bore between the chamber 17 and a seat 21 formed by enlarging the end of the bore.

A fluid strainer 22 which is adapted to be inserted in the bore 18 comprises a perforated cylindrical cage member 23 preferably formed of sheet metal or wire mesh and provided with inwardly directed end flanges 24. A wire mesh or perforated cylindrical core member 25 provided with outwardly extended end flanges 26 serves with the member 23 to form a hollow cylindrical body adapted to receive and retain a mass of suitable straining material 27. This material is preferably formed of curled hair and may, if desired, be treated with oil or other suitable substance to render it more effective in the removal of foreign matter from fluid passed through the strainer.

At the ends of the strainer the straining material 27 is snugly tucked under the flanges 24 and 26 of the members 23 and 25, respectively, so that there will be no loose ends of the material free to be turned over the ends of the members 23 and 25 when the strainer is applied to the cover 16. The straining material, due to its natural resiliency and to its being tucked under the flanges 24 and 26, will possibly bulge outwardly between the ends of said flanges but this bulging portion of the material will be pressed inwardly when the strainer is mounted in the cover 16 in the manner hereinafter described.

The fluid strainer element 22 is held in position within the bore 18 by the application of a retaining screw or plug nut 28 which is threaded to cooperate with the threads 20 formed in the bore 18. The inner end of the nut 28 is provided with an annular rib 29 adapted to be received between the flanges 24 and 26 formed on the members 23 and 25 respectively and serves to compress the straining material 27. The rib or bead 19 formed at the base of the bore 18 is adapted to be received between the flanges 24 and 26 formed on the opposite end of the strainer element in a manner similar to the rib or bead 29. Due to this, the straining material will, at all times, remain in close contact with the beads 19 and 29, so that fluid which may escape past the ends of the member 23 will have to pass through the straining material before it can flow to the interior of the strainer. It will thus be seen that all fluid, before it can be supplied to the piston chamber 11 by way of a passage 31 in the nut 28, must pass through the straining material, consequently the thorough cleaning of the fluid is insured. A shoulder or flange 32, formed on the nut 28 serves as a stop to limit the inward travel of the nut.

A groove 33 formed in the flanged portion 32 of the nut serves as an anchoring means for a cylinder cover gasket 34. The gasket is provided with a bevelled central aperture 35 so as to readily adapt it to be deformed and snapped into the groove 33. The peripheral portion of the gasket 34 is adapted to be retained between the valve casing 10 and the cover portion 16 when the cover portion is secured to the casing in any approved manner, such as by the application of cap screws (not shown). The gasket 34, which is formed of any suitable material such as rubber serves to provide a seal for the piston 12 when the same has been moved under fluid pressure to a full application position by the reduction of brake pipe pressure, in the usual manner, and thus prevents leakage from the auxiliary reservoir to the brake pipe 30 past the piston 12.

When the nut 28 is screwed down in assembling the parts of the cap 16, the flange 32 abuts a seat 21 to limit the inward travel of the nut. By reason of this abutting relation between the flange 32 and seat 21, it is possible to provide a means which will compress the straining material without placing the container under pressure and simultaneously provide a means for positioning the groove 33 so that the gasket 34 is free from any distorting strain under the action of the nut 28.

In charging the valve device, fluid under pressure is supplied thereto from the brake pipe 30 and passes through the strainer element 22 to rid the fluid of all foreign matter which would deter the proper operation of the valve device if allowed to pass to the operating parts. From the strainer element the fluid thus cleaned passes to the piston chamber 11 through the passage 31. The piston 12 is moved to the left under the influence of the fluid under pressure to release position in which a feed groove 37 formed in the bushing 14 is opened to permit the fluid to flow around the piston and into the valve chamber 13 through a groove 38 formed in the rear wall of the piston 12. From the valve chamber 13, the fluid under pressure flows to charge the remainder of the equipment in the usual manner.

By incorporating a fluid strainer in the cylinder cover, it will readily be seen that a simple and effective means has been provided to prevent the admission of foreign matter into the piston chamber and to the operating parts of the valve device. In this manner, it is possible to provide fluid pressure operated valve devices which will operate promptly and efficiently for long periods of time due to the fact that they do not become sluggish in their operation from the accumulation of dirt and other foreign matter.

The co-operation of the beads 19 and 29 with the straining material affords an improved means for insuring against leakage of uncleaned fluid past the strainer element and thus provides added assurance that all fluid supplied to the valve device will be free from foreign matter.

In addition to providing an improved means for retaining the strainer in position, the retaining nut provides an improved anchorage for the cylinder cover gasket so as to provide a piston seal which is retained against buckling by its application to the groove 33 formed in the flange 32 of the retaining nut.

In the foregoing description I have described the strainer as being mounted in the cap 16 of a triple valve device, but I do not wish to be limited to this for it may be mounted in any other casing section of a fluid pressure equipment, for instance, may be mounted in a pipe bracket of the type disclosed in my prior application, Serial No. 545,647, filed June 20, 1931.

While the invention has been described in considerable detail in the foregoing specification, it is understood that various changes may be made in its embodiment without departing from or sacrificing any of the advantages hereinafter claimed.

Having now described my invention, what I claim as new and desire to secure by Letters Patent, is:

1. In a fluid strainer device, the combination of a casing having a communication through which fluid flows, a strainer for straining the fluid flowing through the communication, said strainer comprising a pair of perforate tubular members arranged in spaced concentric relation, and straining material contained in the space between said tubular members, said casing having surfaces thereon engaged by one end of the tubular members, and a plug having screw-threaded connection with said casing, said plug being provided with end surfaces thereon for engaging the opposite end of said tubular members to secure the strainer against movement away from said casing surfaces, and a shoulder thereon for engaging a stop seat on the casing and thereby limiting the movement of the plug so as to prevent distortion of the tubular members of the said strainer.

2. In a fluid strainer device, the combination of a casing having a communication through which fluid flows, a strainer for straining the fluid flowing through the communication, said strainer comprising a pair of perforate tubular members arranged in spaced concentric relation, and straining material contained in the space between said tubular members, said casing having surfaces thereon engaged by one end of the tubular members, and a plug having screw-threaded connection with said casing, said plug being provided with end surfaces thereon for engaging the opposite end of said tubular members to secure the strainer against movement away from said casing surfaces, an annular projection thereon between said end surfaces adapted to extend into the space between the tubular members, and a shoulder thereon for engaging a stop seat on the casing and thereby limiting the movement of the plug so as to prevent distortion of the tubular members of the said strainer.

3. In a fluid strainer device, the combination of a casing having a communication through which fluid flows, a strainer for straining the fluid flowing through the communication, said strainer comprising a pair of perforate tubular members arranged in spaced concentric relation, and straining material contained in the space between said tubular members, said casing having surfaces thereon engaged by one end of the tubular members, and an annular projection between said surfaces adapted to extend into the space between the tubular members, and a plug having screw-threaded connection with said casing, said plug being provided with end surfaces thereon for engaging the opposite end of said tubular members to secure the strainer against movement away from said casing surfaces, an annular projection thereon between said end surfaces adapted to extend into the space between the tubular members, and a shoulder thereon for engaging a stop seat on the casing and thereby limiting the movement of the plug so as to prevent distortion of the tubular members of the said strainer.

ELLIS E. HEWITT.